(12) United States Patent
Yandek et al.

(10) Patent No.: US 7,790,841 B1
(45) Date of Patent: Sep. 7, 2010

(54) INCREASING THE RATE OF CRYSTALLIZATION OF ENGINEERING THERMOPLASTICS

(75) Inventors: Gregory R. Yandek, Boron, CA (US);
Darrell Marchant, Lancaster, CA (US);
Joseph M. Mabry, Lancaster, CA (US);
Mark B. Gruber, Landenberg, PA (US);
Mark A. Lamontia, Landenberg, PA (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 12/079,089

(22) Filed: Feb. 6, 2008

Related U.S. Application Data

(60) Provisional application No. 60/900,309, filed on Feb. 6, 2007.

(51) Int. Cl.
*C08F 6/00* (2006.01)
*C08G 64/00* (2006.01)

(52) U.S. Cl. .................... 528/480; 428/402; 428/404; 524/394; 524/413; 524/423; 524/424; 525/425; 525/452; 525/474; 525/479; 528/502 R

(58) Field of Classification Search ................ 428/402, 428/404; 524/394, 413, 423, 424; 525/425, 525/452, 474, 479; 528/502 R
See application file for complete search history.

(56) References Cited

U.S. PATENT DOCUMENTS

| 4,820,759 A | * | 4/1989 | Ichikawa et al. ............ 524/413 |
| 5,384,196 A | * | 1/1995 | Inoue et al. .............. 428/411.1 |

* cited by examiner

*Primary Examiner*—Terressa M Boykin
(74) *Attorney, Agent, or Firm*—AFMCLO/JAZ; Thomas C. Stover

(57) ABSTRACT

Method for enhancing the crystallization rates of engineering thermoplastics through the use and incorporation of particulate additives with dimensions on the order of 10-1000 nm is described. The presence of nanoparticles at concentrations of, e.g., less than 10 weight percent of the composition, reduces the viscosity of the thermoplastics as compared to the respective homopolymer, thereby increasing polymer chain transport and diffusion to the crystallizing growth front. The prescription of this technology has been shown to reduce crystallization half times of some engineering thermoplastics by as much as 40 percent at optimal crystallization temperatures, an effect that is magnified as the temperature is reduced towards the glassy state of the amorphous phase. Nano-modified engineering thermoplastics with rapid crystallization kinetics and relatively low viscosities can be utilized in component fabrication processes that require rapid processing times, e.g., for the sake of cost efficiency.

16 Claims, 4 Drawing Sheets

PEKK

INCREASING THE RATE OF CRYSTALLIZATION OF ENGINEERING THERMOPLASTICS

CROSS-REFERENCE TO RELATED PATENT APPLICATIONS

This application relates to a provisional patent application Ser. No. 60/900,309, entitled Enhancement of Engineering Thermoplastics with Nanoparticle Modification by the same inventors, filed in the USPTO on 6 Feb. 2007.

STATEMENT OF GOVERNMENT INTEREST

The invention described herein may be manufactured and used by or for the Government for governmental purposes without the payment of any royalty thereon.

FIELD OF THE INVENTION

This invention relates to a method for enhancing the crystallization rate of certain plastics, particularly engineering thermoplastics.

BACKGROUND OF THE INVENTION

Engineering thermoplastics are a class of materials that exhibit high performance in terms of their mechanical and thermal properties as well as chemical resistance. Generally derived from expensive monomers, these polymers are produced in relatively low volumes and are more costly compared to aliphatic thermoplastics. In terms of chemical architecture, engineering thermoplastics are comprised at least in part of aromatic groups and polar moieties, deriving their superior properties from strong interactions between chains as well as intrinsic bond strengths. Also contributing to their performance, many engineering thermoplastics are semi-crystalline in nature, including poly(ether-ether-ketone) (PEEK), polysulfides (PSF), polysulfones (PSU), polyphenylene sulfide (PPS), poly(ether-ketone-ketone), and polyamides. The superior properties of these materials provide them as viable lightweight substitutes to metals in many demanding applications.

In general, to achieve the optimal mechanical properties and environmental durability inherent to engineering thermoplastics and composite structures made from such materials an adequate degree of polymer crystallinity needs to be achieved. Processing conditions ultimately control observed microstructures in this class of materials and while polymers achieve full crystallinity with processes imposing adequate annealing times, only a fraction of the potential crystallinity is developed with rapid manufacturing techniques characterized by polymer cooling through the glass transition temperature from the melt state in seconds. Therefore, it would be cost-effective to develop a means to increase the crystallization rates of engineering thermoplastics for the sake of fabricating structures with methods imposing rapid processing cycle times.

Engineering thermoplastics can often be difficult to process due to their high melt viscosities, a direct result of the intrinsic polarity of the chemical groups that comprise the polymer backbones coupled with their relative chain stiffness. With conventional polymer processing methods, viz. compounding, extrusion, and injection molding, high temperatures and robust equipment are generally necessary for component production. In the particular case of carbon fiber composite fabrication, high viscosities impede the diffusion of polymer chains between layers of laminates which may result in less than optimal mechanical properties of the ultimate composite. Thus, it would be beneficial to develop a means to reduce the viscosities of engineering thermoplastics without sacrificing the properties that set them apart from other types of polymers.

Thus, it would be desirable to increase the crystallization rates of engineering thermoplastics for rapid fabrication of structures, products and components thereof. And there is need and market for same, which overcomes the above prior art shortcomings.

There has now been discovered a method for increasing the crystallization rate of engineering thermoplastics to provide well formed and durable plastic products made in rapid processing cycles.

SUMMARY OF THE INVENTION

Broadly, the present invention provides a method for enhancing the crystallization rate of engineering thermoplastics by incorporating nanoparticles therein to accelerate the crystallization rate of such thermoplastics.

The invention further provides nanoparticle-modified engineering thermoplastics that exhibit an increased crystallization rate over their respective homopolymers.

DEFINITIONS

By semi-crystalline engineering plastics, as used herein, is meant plastic materials that are in part comprised of aromatic and/or polar groups in the chemical structure of the monomers utilized as building blocks and whose polymer chains align themselves in crystalline fashion during heat treatment above the glass transition temperature of the amorphous phase of the polymer and below the equilibrium melting point of the subject polymer.

By enhanced crystalline behavior, as used herein, is meant accelerated crystallization kinetics which may be defined by a measured crystallization half-time (half the time required to reach 50% of full crystallinity during annealing), and/or higher achieved ultimate fractions of overall crystallinity after adequate annealing, both traits in comparison with the respective polymer.

By particulate fillers, as used herein, is meant particles that exhibit at least nano-scale size dimensions in at least one dimension, may exhibit elemental compositions consisting of silicon, oxygen, carbon, and/or metals, and may be of approximately the same length scale in all dimensions or plate-like or acicular in structure.

By plasticizer, as used herein, is meant any additive which may be in a solid or liquid state that acts toward reducing the viscosity of a plastic material.

By heterogeneous nucleation sites, as used herein, is meant any particle dispersed in a crystallizable polymer that is of foreign composition to the polymer which the polymer chains select as a substrate for crystallization or epitaxial growth, circumventing the requirement for the polymer to form long-range ordered structures characteristic of homogeneous nucleation.

By enhanced ultimate fractions of crystallinity, as used herein, is meant measured overall crystallinity after appropriate annealing conditions which surpass a control case. Crystallinity content may be measured by quantifying the melting endotherm of a material during non-isothermal scanning of a test sample in conventional differential scanning calorimetry (DSC) experiments.

By enhanced physical properties, as used herein, is meant higher measured glass transition temperature of the polymer, reduced loss in modulus beyond the glass transition temperature, higher demonstrated values of modulus, and reduced weight gain during exposure to low molecular weight substances, all in comparison with a control case.

By nanoparticles that arrange themselves in a crystalline fashion, as used herein, is meant any grade of material that in elementary form is comprised of nanoscale-sized molecules that align themselves in crystalline fashion to form particles that may be micro-sized in nature, but exhibit a succinct melting point such that above that temperature, will break down into their elementary particle sizes to form a disordered liquid, a trait that may be strategically employed for the purposes of dispersion in a host material.

The present invention describes methods of developing new compositions of nanoparticle-modified engineering thermoplastics that exhibit enhanced crystallization rates and reduced viscosities over their respective homopolymer for the purposes of reducing structure fabrication processing times and facilitating ease of manufacturing. The preferred compositions presented herein contain two primary material combinations: (1) additives that demonstrate an elementary particle size with dimensions on the order of nanometers, viz. polyhedral oligomeric silsesquioxanes (POSS), silicates, organo-modified silicates, carbon nanotubes, carbon nanofibers, polymorphs of carbon, metallic oxides, metals, and the elementary particles of minerals; and (2) semi-crystalline engineering thermoplastics such as poly(ether-ether-ketones) (PEEK), poly(ether-ketone-ketones) (PEKK), poly(ether-ketones) (PEK), polyamids, polycarbonate (PC), polysulfones (PSU), polyamides, polyphenylene sulfides (PPS), and polyethylene terephthalate (PET).

The preferred method of incorporating the nanoparticles (1) into the polymer hosts (2) is through non-reactive blending methods encompassing melt blending with conventional polymer processing equipment (either batch or continuous in nature) as well as solution blending through the utilization of solvents. The successful application of this invention is predicated on achieving a good dispersion of the nanoparticles in the subject polymer host which may be controlled through chemical tailoring of the particle surface or periphery through synthesis or treatment.

BRIEF DESCRIPTION OF THE DRAWINGS

The invention will become more apparent from the following detailed specification and drawings in which.

DETAILED DESCRIPTION OF THE INVENTION

The present invention describes methods of incorporating nanoparticles into semi-crystalline engineering thermoplastics to accelerate their crystallization rates and reduce their melt viscosities for the purposes of reducing structure fabrication cycle times and energy requirements thereby improving their cost effectiveness.

Despite a significant body of literature on the subject of polymer crystallization, investigations regarding the enhancement of the crystalline behaviors of semi-crystalline engineering thermoplastics are notably absent. In principle, the physics of crystallization of this class of materials is unique compared to its hydrocarbon-based thermoplastic counterparts, due in large part to their relative chain rigidity introduced by aromatic and polar chemical subunits. Therefore, the effects of filler addition are remarkably different and enhance crystallization kinetics by a contrasting mechanism. As discussed previously, flexible crystallizable polymers can select particles as heterogeneous nuclei. Rigid molecules, however, demonstrate far less of a propensity to crystallize on foreign substrates that are particulate in nature (this distinction is made as it has been shown that PEEK crystallizes on carbon fiber). Rather, taking advantage of the fact that engineering thermoplastics derive their superior properties from interactions between polymer chains, the addition of a small amount of readily dispersed nanoparticles (i.e., 0.5 to 10 wt. % of the mixture) forces a level of chain separation thereby reducing the viscosity of the nano-modified composite over the respective homopolymer. A reduction in viscosity is accompanied by increased chain mobility and molecular transport to the crystallization growth front during the course of a first order transition. Therefore, the technology of this invention is rooted in reducing the polymer interactions inherent to engineering thermoplastics only to a limited extent that is not detrimental to ultimate physical properties such that molecular diffusion is increased, demanding only the addition of a small amount of nanoparticles. As crystallization occurs in nano-modified engineering thermoplastics, the majority of nanoparticles would likely be dispelled outside of a growing spherulite since the typical dimensions of a polymer crystal's unit cell are sub-nanometer in all dimensions forcing the nanoparticles to ultimately reside in the amorphous phase of the material. The toughness of a semi-crystalline polymer is derived from chain entanglements in the amorphous phase therefore the amount of nanoparticles must be carefully considered in the material design process.

EXAMPLES

The invention is further described in the following examples, which should not be construed in limitation thereof.

Example 1

Melt Blending

Example 1a

Figure 1:
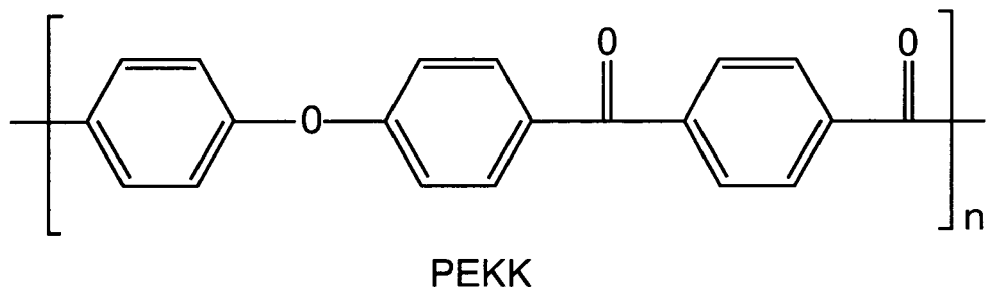
FIG. 1 shows the chemical structure of poly(ether-ketone-ketone) (PEKK)
Figure 2:
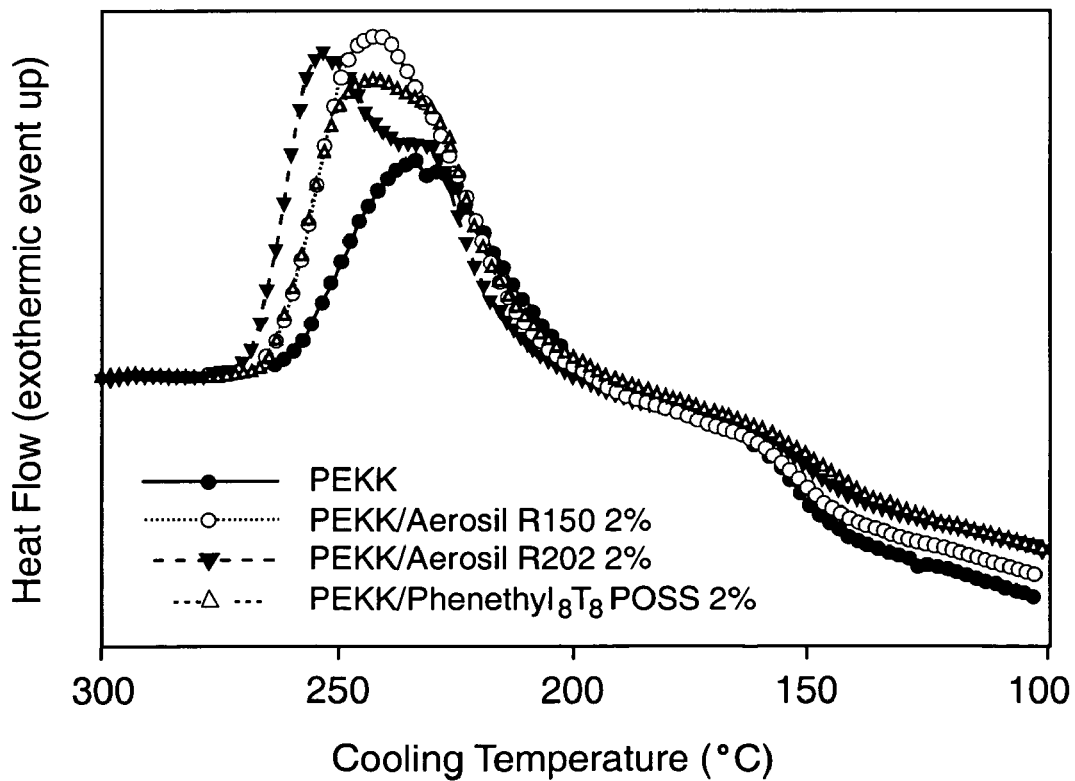
FIG. 2 is a graph showing the non-isothermal crystallization kinetics of various PEKK/nanoparticle blends in comparison with the control (red) quenched from the molten state as acquired by differential scanning calorimetry, scan rate 10° C./minute.
Figure 3:
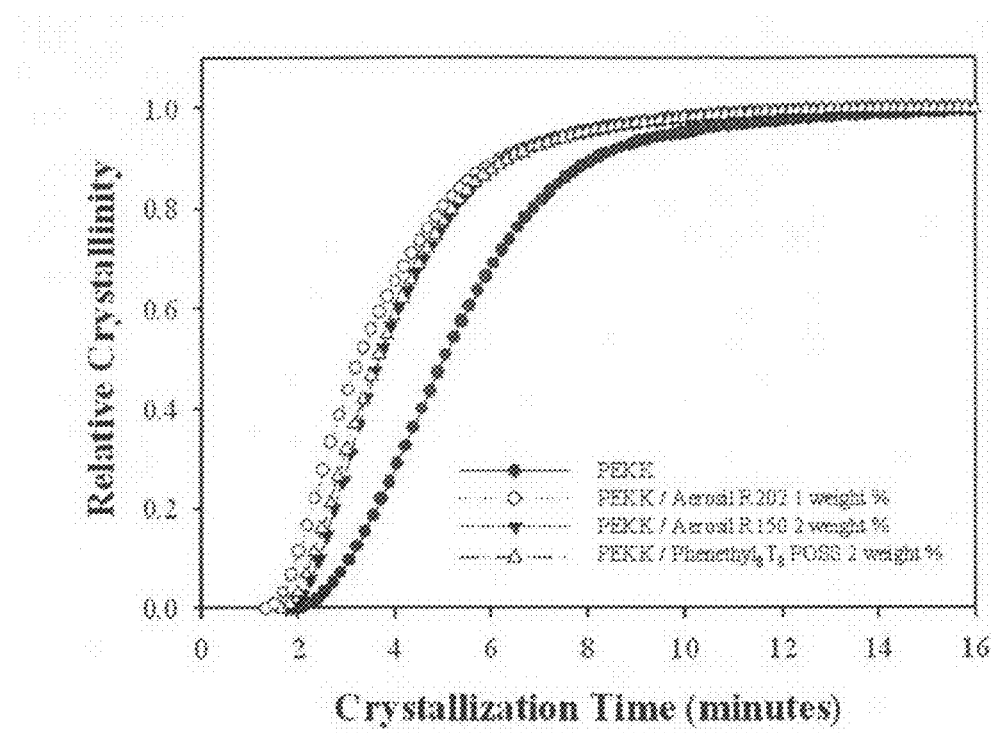
FIG. 3 is a graph showing the relative degree of achieved crystallinity during isothermal anneal (240° C.) of various PEKK/nanoparticle blends, loaded at low concentration, in comparison with the control (red), data acquired through differential scanning calorimetry.
Figure 4:
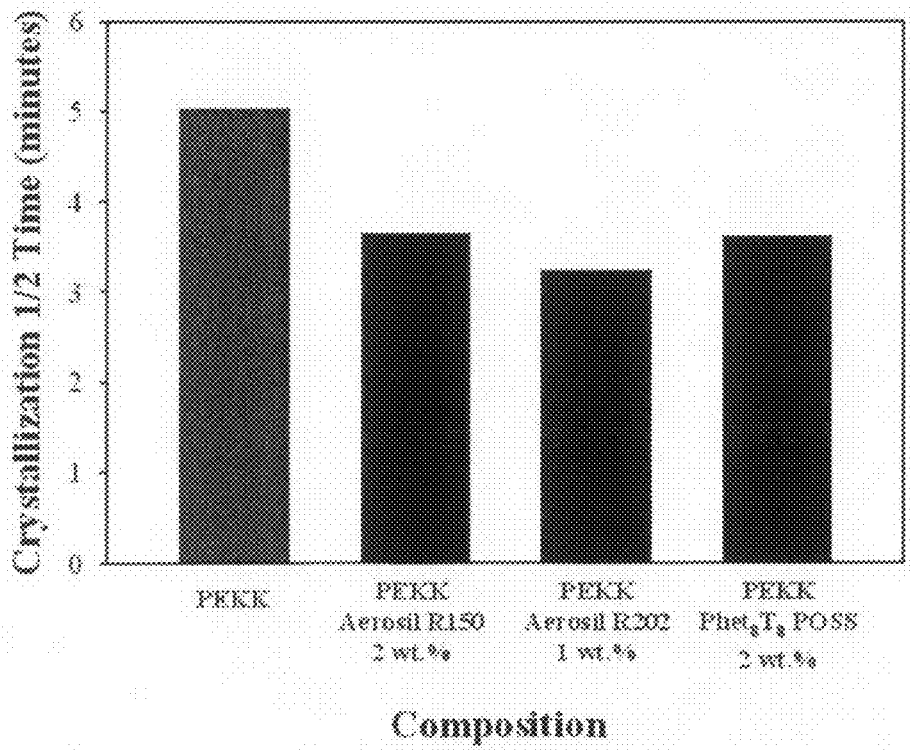
FIG. 4 is a bar graph showing the crystallization half-times of PEKK/nanoparticle blends, loaded at low concentration, in comparison with the control (red).
Figure 5:
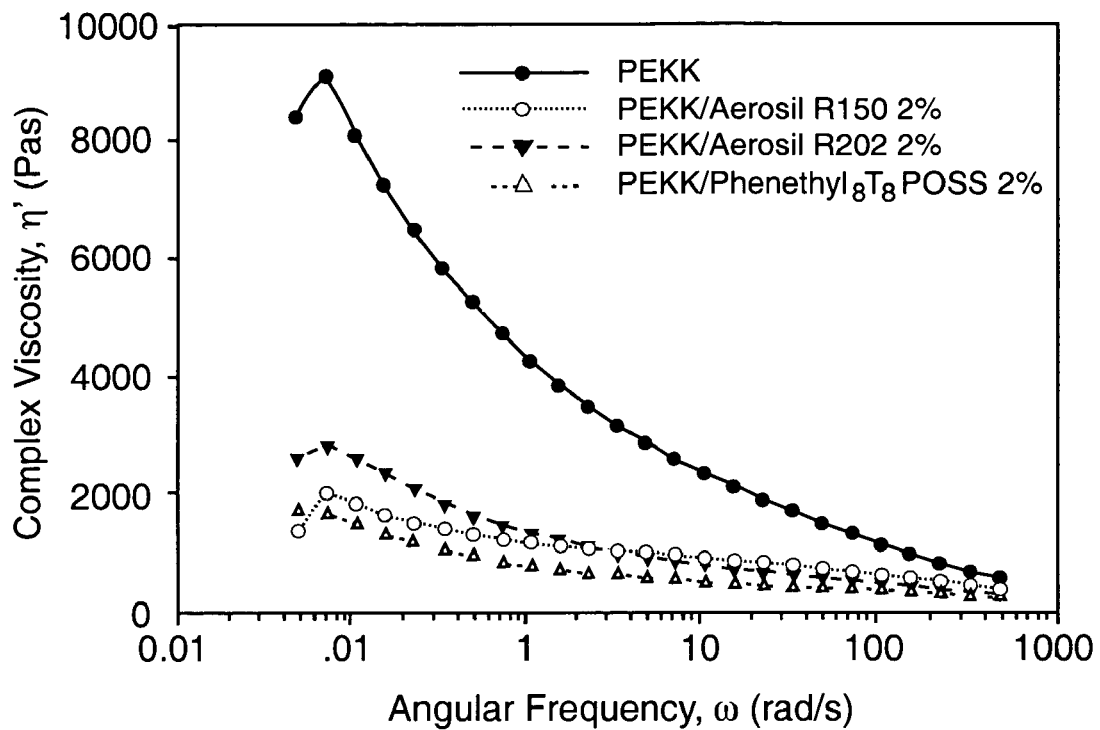
FIG. 5 is a graph showing the complex viscosities as a function of oscillatory angular frequency of PEKK/nanoparticle blends, loaded at low concentration, in comparison with the control (red).
Figure 6:
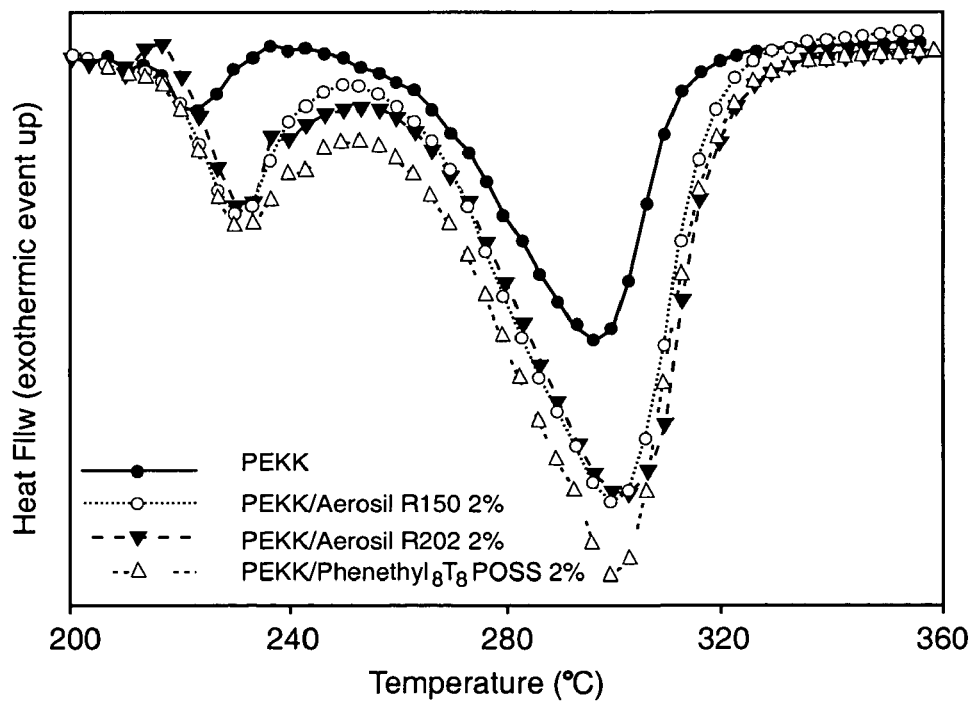
FIG. 6 is a graph showing the heats of fusion of the crystalline fractions of PEKK (red) and its blends with nanoparticles, loaded at low concentration, after an hour of isothermal annealing at 205° C. demonstrating that approximately twice the crystallinity develops in the presence of nanoparticles

Poly(ether-ketone-ketone) in powder form, its chemical structure depicted in FIG. 1, was dry blended with one to ten weight percent of one of either two types of fumed silica provided by Degussa, grades Aerosil R150 (no surface treatment, hydrophilic) and Aerosil R202 (surface treated with polydimethylsiloxane, hydrophobic), both of elementary average particle size of 14 nm. A DSM twin screw batch mixer was employed to perform the melt compounding under a nitrogen atmosphere with all temperature zones set to a flat profile of 340° C., above the equilibrium melting point of the subject grade of PEKK. The powder blend was charged to the mixer imposing a residence time of five minutes after which the material was extruded in the form of strands for differential scanning calorimetry (DSC) measurement. DSC measures the heat flow required to maintain a polymer sample's temperature identical to that of an empty control cell and is useful for analyzing polymer transitions and reaction kinetics. In a typical non-isothermal DSC experiment, 5 mg of compounded extrudate were characterized for crystallization behavior by erasing the thermal history of the sample above the equilibrium melting point of PEKK for ten minutes followed by a 10° C./minute sweep to room temperature. Polymer crystallization is an exothermic process (producing heat) as the material transitions to a state of lower free energy. Therefore, as crystallization occurs, a peak will be discerned via DSC, the results of which are shown in FIG. 2 for various PEKK/nanoparticle blends. The results indicate that upon cooling from the molten state, the polymers containing one and two weight percent nanoparticles demonstrate accelerated ordering in comparison with the homopolymer control as their respective peaks commence at higher temperatures (i.e., earlier times). The extent of improvement may be quantified through isothermal DSC experiments. Again, 5 mg of sample are heat treated above the melting point of the subject grade of PEKK to facilitate erasure of thermal history, subsequently rapidly quenched at 100° C./minute to the isothermal crystallization temperature, in this case 240° C. The sample is held at this temperature and the exothermic heat flow inherent to crystallization is monitored until the signal levels off to the baseline. The results of this analysis are depicted in FIG. 3 where it is witnessed after deduction that the addition of one to two weight percent of fumed silica reduces the crystallization half-time (time to achieve 50 percent crystallinity) by approximately 40 percent (depicted in FIG. 4). Enhancements in crystallization kinetics are facilitated by viscosity reductions in the blends over the control as witnessed in FIG. 5. At lower temperatures, the addition of nanoparticles enables the engineering thermoplastic to achieve higher levels of crystallinity than the homopolymer as demonstrated in FIG. 6. The melting endotherms of the polymers in the annealed state indicate that double the crystallinity develops in the presence of nanoparticles as opposed to the neat polymer at temperatures approaching the glassy state of the amorphous phase.

Example 1b

Figure 7:
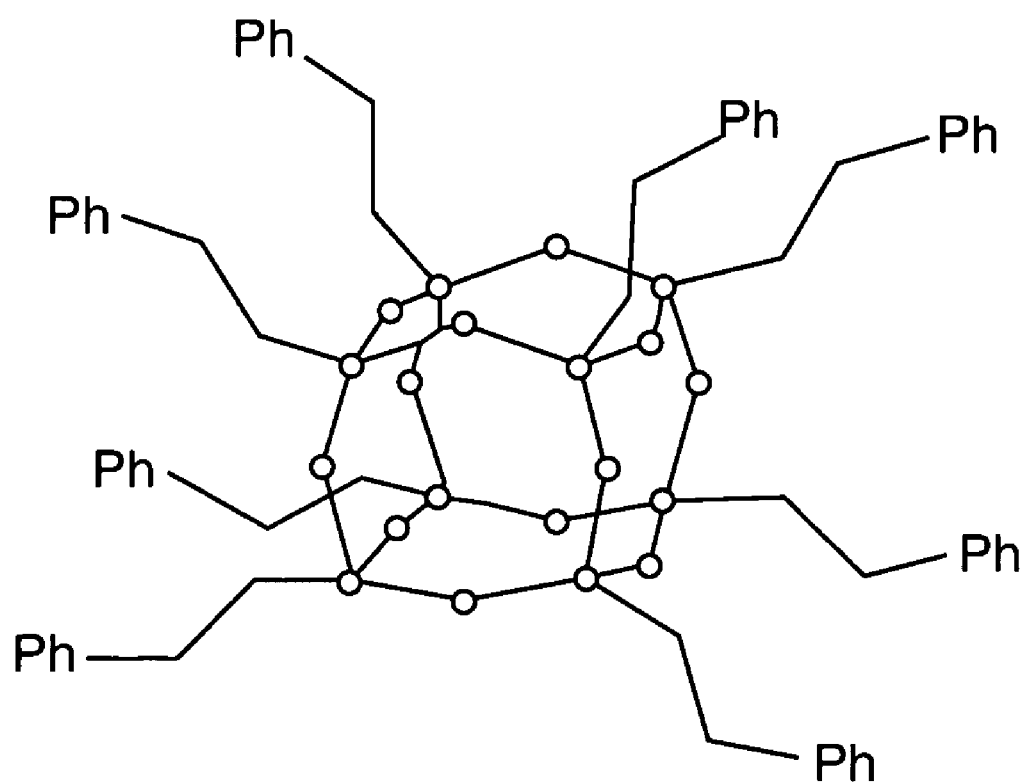
FIG. 7 shows the chemical structure of phenethyl$_8$T$_8$ polyhedral oligomeric silsesquioxane (POSS).

Following the same procedure outlined in Example 1a, POSS is incorporated into PEKK. POSS consists of an inorganic cage-type core of silicon and oxygen at a ration of 1:1.5, covalently surrounded by an organic periphery that may be tailored for target host polymer compatibility. In this case, $[C_8H_9SiO_{1.5}]_8$, alternatively known as phenethyl$_8$T$_8$POSS is utilized as it demonstrates a succinct melting point of 80° C. introducing the possibility of achieving a nano-scale level of dispersion in the polymer host. The chemical structure of this version of POSS is shown in FIG. 7 where Ph designates a phenyl moiety. It should be highlighted that many inert commercially available versions of POSS are marketed in a crystallized form with average particle sizes on the order of tens of microns. As these crystallites are bound by very strong molecular forces, they tend to degrade before they melt and thus cannot be dispersed down to their elementary particle size in polymer hosts. Thus, $[C_8H_9SiO_{1.5}]_8$ was strategically selected to demonstrate the technology of this invention. The two weight percent POSS containing blend exhibits more rapid crystallization kinetics from the molten state in comparison with the control. The non-isothermal and isothermal crystallization results are shown in FIGS. 2 and 3, respectively.

Example 2

Solution Blending

Example 2a

Poly(ether-ketone-ketone) and $[C_8H_9SiO_{1.5}]_8$, at two to ten weight percent of the overall mass of the composition, were weighed in a vial. A common solvent for the two components, namely pentafluorophenol, was added until the overall solute concentration was 20 percent. The mixture was magnetically stirred at 120° C. using a hot plate until complete solute dissolution. The pentafluorophenol was subsequently recovered through distillation above the glass transition temperature of the engineering thermoplastic. The resultant solute was subsequently dried overnight in a vacuum oven at 70° C.

Example 2b

Poly(ether-ketone-ketone) and Aerosil R150, at two to ten weight percent of the overall mass of the composition, were weighed in a vial. Pentafluorophenol was added until the overall solute concentration was 20 percent. The mixture was magnetically stirred at 120° C. using a hot plate until complete polymer solute dissolution (note that the fumed silica is insoluble). The pentafluorophenol was subsequently recovered through distillation above the glass transition temperature of the engineering thermoplastic. The resultant solute was subsequently dried overnight in a vacuum oven at 70° C.

Added Example

The following is a further example of the advantages of the present invention:

Thermosetting (TS) polymers are commonly used to produce polymer matrix composites (PMCs). Because of polymer crosslinking, TS PMCs possess excellent mechanical properties. These materials must be prepared and placed in an autoclave to cure. Autoclaves require high temperatures and pressures and are therefore very expensive. Also, because TS PMCs are crosslinked, the materials cannot be recycled.

Engineering thermoplastic (TP) polymers can also be used to produce PMCs. TP PMCs are not crosslinked, but must achieve a high degree of crystallinity in order to attain the mechanical properties of TS PMCs.

Poly-ether-ether-ketone (PEEK) is a TP resin used to produce PMCs. PEEK crystallizes rapidly during PMC production, allowing excellent mechanical properties to be attained. Because PEEK is a TP, the PMCs can also be recycled. The problem however is that PEEK resin is quite expensive. This is one reason that PEEK-based PMCs are rare compared to TS PMCs.

Poly-ether-ketone-ketone (PEKK) is an alternative engineering TP resin. PEKK is much less expensive that PEEK, but the mechanical properties of PEKK-based PMCs are similar to those of PEEK-based PMCs. PEKK is also a TP and therefore can be recycled. The problem with PEKK is that its rate of crystallization is too slow for conventional PMC processing. Therefore PEKK-based PMCs require an additional annealing step, where they must be placed in an oven in order to attain the proper level of crystallinity, and therefore, mechanical properties. The annealing step increases the cost of PEKK-based PMCs to above that of PEEK-based PMCs.

To summarize, in order to achieve desired mechanical properties:
a. TS PMCs require an expensive autoclave process.
b. PEEK-based PMCs require expensive PEEK resin.
c. PEKK-based PMCs require an expensive annealing step.

Thus, in this example, in addition to increasing the rate of crystallization of PEKK, the total crystallinity attained is higher than that of unfilled PEKK. Therefore, by the addition of nanoparticles during processing, it can be possible to avoid the expensive annealing step currently required during PEKK-based PMC processing. If the annealing step is eliminated from PEKK processing, PEKK-based PMCs can be much less expensive than PEEK-based PMCs. They can also be less expensive than many TS PMCs, as well as having the advantage of being recyclable.

The present invention accordingly provides a method to increase the rate of crystallization of the composition of semi-crystalline engineering plastics by adding nanoparticles during processing with the other advantages described below. The invention further provides the novel compounds produced by such method.

In summary, these engineering plastics are aromatic, that is, they contain ring structures or heterocycles and when nanoparticles are added, the polymer chains spread slightly apart, giving added flexibility and increasing the speed of crystallization thereof.

There are at least three benefits of the invention:
The rate of crystallization is increased,
The degree of crystallinity is increased and
The polymer chains are spread apart by the nanoparticles, and
The density of the composition is decreased and is thus easier to process in various applications.

What is claimed is:

1. A method for increasing the crystallization rate of engineering thermoplastics comprising, adding 0.5 to 10 wt. % of nanoparticles, from 1-1000 nm in size, to said thermoplastics, and dispersing said particles at a temperature above the melting temperature of the subject polymer, wherein said thermoplastics are semi-crystalline engineering thermoplastics of poly(ether-ether-ketones) (PEEK), poly(ether-ketone-ketones) (PEKK), poly(ether-ketones) (PEK), polyamids, polycarbonate (PC), polysulfones (PSU), polyamides, polyphenylene sulfides (PPS), polyethylene terephthalate (PET) or a combination of two or more thereof so as to provide enhanced crystalline behavior to said thermoplastics.

2. The method of claim 1 wherein said nanoparticles are selected from the group consisting of polyhedral oligomeric silsesquioxanes (POSS), silicates, organo-modified silicates, carbon nanotubes, carbon nanofibers, polymorphs of carbon, metallic oxides, metals, and the elementary particles of minerals.

3. The method of claim 1 wherein nanoparticles are added into said thermoplastics by a method comprising, melt-blending or solution-blending thereof by solvents, such as diphenyl ether, pentafluorphenol and chlorinated solvents.

4. A composition comprising engineering thermoplastics modified by adding nanoparticles, that exhibit faster crystallization than their respective homopolymers, wherein said thermoplastics are semi-crystalline engineering thermoplastics of poly(ether-ether-ketones) (PEEK), poly(ether-ketone-ketones) (PEKK), poly(ether-ketones) (PEK), polyamids, polycarbonate (PC), polysulfones (PSU), polyamides, polyphenylene sulfides (PPS), polyethylene terephthalate (PET) or a combination of two or more thereof and have enhanced crystalline behavior.

5. The composition of claim 4 wherein carbon fibers are also added to said thermoplastic for formation of composite products.

6. The method of claim 1 wherein said nanoparticles or particulate fillers have dimensions of 1-1000 nm.

7. The method of claim 6 wherein the compositions of said thermoplastics and said fillers are blended in a batch mixer or a continuous mixer, above the melting point of said thermoplastics.

8. The method of claim 6 wherein said compositions are blended in a common solvent.

9. The method of claim 6 wherein said compositions are blended in a solvent for said thermoplastics.

10. The method of claim 6 wherein a composition containing nanoparticles that arrange themselves in a crystalline fashion, are blended into said thermoplastic at a temperature above its melting point.

11. The method of claim 6 wherein said particulate fillers define a nanoparticulate additive which acts as a plasticizer for said thermoplastics.

12. The method of claim 6 wherein said thermoplastics and said fillers exhibit enhanced ultimate fractions of crystallinity over their respective homopolymers after heating to a temperature above the melting temperature of the subject polymer.

13. The method of claim 6 wherein said thermoplastics and said fillers exhibit enhanced physical properties of higher glass transition temperature, lower modulus loss in rubbery plateau region or higher elastic and compressive moduli or a combination of two or more thereof, over their respective homopolymers after heating to a temperature above the melting temperature of the subject polymer.

14. The method of claim 2 wherein carbon fibers, in the form of tow, tape or fabric or a combination of two or more thereof, are pre-pregged with a matrix composition having a combination of said thermoplastics and of said nanoparticles, for the fabrication of composite products.

15. The method of claim 1 wherein said nanoparticle is of POSS and said thermoplastics is PEKK, wherein said POSS exhibits a melting point below that of the processing temperature of PEKK (340-400° C.) to enable a nanoscale level of dispersion.

16. The composition of claim 4 wherein said nanoparticles are selected from the group consisting of polyhedral oligomeric silsesquioxanes (POSS), silicates, organo-modified silicates, carbon nanotubes, carbon nanofibers, polymorphs of carbon, metallic oxides, metals, and the elementary particles of minerals.

* * * * *